(12) United States Patent
Rhim

(10) Patent No.: US 9,026,579 B2
(45) Date of Patent: May 5, 2015

(54) METHOD AND APPARATUS FOR PROVIDING/RECEIVING SERVICE OF PLURALITY OF SERVICE PROVIDERS

(75) Inventor: Eun-hee Rhim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 950 days.

(21) Appl. No.: 12/191,567

(22) Filed: Aug. 14, 2008

(65) Prior Publication Data

US 2009/0055877 A1 Feb. 26, 2009

Related U.S. Application Data

(60) Provisional application No. 60/957,252, filed on Aug. 22, 2007.

(30) Foreign Application Priority Data

Apr. 14, 2008 (KR) ........................ 10-2008-0034208

(51) Int. Cl.
*G06F 15/16* (2006.01)
*H04N 7/173* (2011.01)
*H04N 7/16* (2011.01)
*H04N 21/462* (2011.01)
(Continued)

(52) U.S. Cl.
CPC ........... *H04N 7/163* (2013.01); *H04N 21/4622* (2013.01); *H04N 21/4722* (2013.01); *H04N 21/4828* (2013.01)

(58) Field of Classification Search
CPC .......... H04N 21/4622; H04N 21/4722; H04N 21/4828; H04N 7/163
USPC .................................................. 709/203, 231
See application file for complete search history.

(56) References Cited

U.S. PATENT DOCUMENTS

| 7,188,179 B1 * | 3/2007 | Hanson et al. ................ 709/227 |
| 7,353,295 B1 * | 4/2008 | Crow et al. .................... 709/245 |
| 7,430,495 B1 * | 9/2008 | Govindan et al. ............. 702/183 |

(Continued)

FOREIGN PATENT DOCUMENTS

| KR | 10-2002-0011671 A | 2/2002 |
| KR | 10-2005-0016639 A | 2/2005 |

(Continued)

OTHER PUBLICATIONS

Chiao et al. Video Everywhere Through a Scalable IP-Streaming Service Framework, in: International Symposium on Wireless Communication Systems (ISWCS) Sep. 2006, pp. 190-194.*

(Continued)

*Primary Examiner* — Waseem Ashraf
*Assistant Examiner* — Robert Shaw
(74) *Attorney, Agent, or Firm* — Sughrue Mion, PLLC

(57) ABSTRACT

Provided are a method and apparatus for providing/receiving a service from a plurality of service providers. In the method, in order to receive services from servers of a plurality of service providers, a client receives information regarding a plurality of services that can be received from a server of a service provider selected from among the service providers, requests the server to provide a service from among the services based on the received information, and then receives the service from the server. Accordingly, it is possible to allow the client to search for and receive a service from among services of a plurality of service providers.

7 Claims, 7 Drawing Sheets

(51) Int. Cl.
*H04N 21/4722* (2011.01)
*H04N 21/482* (2011.01)

(56) References Cited

U.S. PATENT DOCUMENTS

| | | | | |
|---|---|---|---|---|
| 7,580,862 | B1 * | 8/2009 | Montelo et al. | 705/26.1 |
| 7,631,260 | B1 * | 12/2009 | Riggs et al. | 715/716 |
| 2002/0010777 | A1 * | 1/2002 | Ushiku | 709/225 |
| 2002/0143819 | A1 * | 10/2002 | Han et al. | 707/513 |
| 2004/0015405 | A1 * | 1/2004 | Cloutier et al. | 705/26 |
| 2004/0226051 | A1 * | 11/2004 | Carney et al. | 725/135 |
| 2005/0042983 | A1 * | 2/2005 | Borgward | 455/3.06 |
| 2005/0160154 | A1 * | 7/2005 | Raciborski et al. | 709/219 |
| 2005/0198188 | A1 * | 9/2005 | Hickman | 709/217 |
| 2005/0273522 | A1 | 12/2005 | Kohler | |
| 2005/0283791 | A1 * | 12/2005 | McCarthy et al. | 725/1 |
| 2006/0248570 | A1 * | 11/2006 | Witwer | 725/135 |
| 2007/0107025 | A1 | 5/2007 | Li et al. | |
| 2007/0150926 | A1 | 6/2007 | Zuo | |
| 2007/0162929 | A1 | 7/2007 | Mickle et al. | |
| 2007/0162945 | A1 * | 7/2007 | Mills | 725/119 |
| 2007/0220558 | A1 * | 9/2007 | Jung et al. | 725/62 |
| 2007/0288478 | A1 * | 12/2007 | DiMaria et al. | 707/10 |
| 2008/0002674 | A1 * | 1/2008 | Lubbers et al. | 370/352 |
| 2008/0056673 | A1 * | 3/2008 | Morris | 386/95 |
| 2008/0098450 | A1 * | 4/2008 | Wu et al. | 725/132 |
| 2008/0127255 | A1 * | 5/2008 | Ress et al. | 725/38 |
| 2008/0148317 | A1 * | 6/2008 | Opaluch | 725/46 |
| 2008/0148322 | A1 * | 6/2008 | Howcroft | 725/87 |
| 2008/0163328 | A1 * | 7/2008 | Philbin et al. | 725/139 |
| 2008/0172479 | A1 * | 7/2008 | Majanen et al. | 709/221 |
| 2008/0256232 | A1 * | 10/2008 | Fleury et al. | 709/224 |
| 2009/0175296 | A1 * | 7/2009 | P et al. | 370/466 |
| 2009/0217337 | A1 * | 8/2009 | Åström | 725/115 |
| 2009/0307307 | A1 * | 12/2009 | Igarashi | 709/203 |

FOREIGN PATENT DOCUMENTS

| | | | | |
|---|---|---|---|---|
| KR | 10-2004-0070247 | * | 11/2006 | H04N 7/00 |
| KR | WO 2007/100231 | * | 3/2007 | |
| KR | WO 2008/084965 A1 | * | 7/2008 | |
| SE | WO 02/54697 A1 | * | 7/2002 | H04L 29/00 |
| WO | WO 2004/059502 | * | 12/2003 | G06F 15/16 |
| WO | WO 2004/059502 | * | 7/2004 | G06F 15/16 |
| WO | 2008/084965 A2 | | 7/2008 | |
| WO | WO 2008/082346 | * | 7/2008 | |
| WO | 2009/020332 A2 | | 2/2009 | |

OTHER PUBLICATIONS

Advogato, RSS Disposition Hinting Proposal, http://www.advogato.org/article/852.html.*
Peltotalto et al. A Massively Scalable Persistent Content Distribution System, in: International Conference on Communications, Internet and Information Technology (CIIT) , Banff, Alberta, Canada, Jul. 2-4, 2007.*
Callaly et al. Architecture of a PVR Appliance with 'Long-Tail' Internet-TV Capabilities, IEEE Transactions on Consumer Electronics, vol. 52, No. 2, May 2006 , pp. 454-459.*
ETS I, Digital Video Broadcasting (DVB); Transport of MPEG-2 Based DVB Services over IP Based Networks, ETSI TS 102 034 V1.2.1 (Sep. 2006) ("DVB-IP").*
RFC 2782-DNS SRV, IETF, Feb. 2000.*
Trossen et al, Service Discovery & Availability Subscriptions Using the SIP Event Framework, ICC 2005, IEEE (2005), pp. 1572-1577.*
Delgado, "Implementation and Evaluation of the Service Peer Discovery Protocol" MS Thesis, KTH Microelectronics and Information Technology, Stockholm, Sweden (2004).*
ETSI, Digital Video Broadcasting (DVB); Transport of MPEG-2 Based DVB Services over IP Based Networks, ETSI TS 102 034 V1.2.1 (Sep. 2006) ("DVB-IP").*
ETSI, (PTV architecture: Dedicated subsystem for IPTV functions in NGN, Draft ETSI DTS 02049 v0.0.6 (May 2007) (IPTV-NGN).*
ETSI, "DVB—IP Datacast over DVB-H: Electronic Service Guide (ESG)" ETSI TS 102 471 V1.2.1 (Nov. 2006) ("DVB-H ESG").*
UPnP Device Architecture 1.0, UPnP Forum, (Jul. 2006).*
Ott et al, Networked Multimedia with Internet Media Guides, Computational Methods in Science and Technology 11(2), 129-139 (2005).*
Sivchenko et al—IMS based IPTV services, MobiMedia'07, ACM (2007).*
RFC 2782—DNS SRV, IETF, Feb. 2000.*
RFC 2610—DHCP options for SLP.*
RFC 2608 - SLP v2.*
RFC 2165—SLP.*
Kempf et al, Finding a SIP Server With SLP, draft-kempf-sip-findsrv-00.txt, Feb. 2000.*
Zhao et al, Remote Service Discovery in SLP via DNS SRV, Aug. 2004 draft-zhao-slp-remote-da-discovery-05.txt.*
Limam et al, OSDA: Open service discovery architecture for efficient cross-domain service provisioning, Computer Communications 30 (2007) 546-563 (Available online Jan. 11, 2006).*
Rosenberg et al, Wide Area Network Service Location, IETF, 1997 draft-ietf-svrloc-wasrv-01.txt.*
Communication, dated Aug. 30, 2012, issued by the European Patent Office in corresponding European Application No. 08793202.6.
Communication, dated Aug. 23, 2012, issued by the Mexican Patent Office in corresponding Mexican Application No. MX/a/2010/001838.
Open IPTV Forum: "Open IPTV Forum—Functional Architecture V 1.1," Jan. 15, 2008, XP007906507, pp. 1-141.
"IPTV Architecture: Dedicated subsystem for IPTV functions in NGN," ETSI DTS 02049 V0.0.6, Jun. 19, 2007, XP014056708, pp. 1-28.
Communication, dated Sep. 6, 2013, issued by the European Patent Office, in counterpart Application No. 08793202.6.
Communication from the European Patent Office issued Dec. 2, 2013 in a counterpart European Application No. 08793202.6.
Communication dated Apr. 8, 2013 issued by the European Patent Office in counterpart European Patent Application No. 08 793 202.6.
Communication dated Mar. 11, 2014, issued by the Korean Intellectual Property Office in counterpart Korean Application No. 10-2008-0034208.

* cited by examiner

METHOD AND APPARATUS FOR PROVIDING/RECEIVING SERVICE OF PLURALITY OF SERVICE PROVIDERS

CROSS-REFERENCE TO RELATED PATENT APPLICATIONS

This application claims the benefit of U.S. Provisional Application No. 60/957,252, filed on Aug. 22, 2007, in the USPTO, and Korean Patent Application No. 10-2008-0034208, filed on Apr. 14, 2008, in the Korean Intellectual Property Office, the disclosures of which are incorporated herein in their entirety by reference.

BACKGROUND OF THE INVENTION

1. Field of the Invention

Methods and apparatuses consistent with the present invention relate to providing/receiving a service from a plurality of service providers, and more particularly, to a method and apparatus for allowing a client to select an Internet protocol television (IPTV) service from among IPTV services provided by a plurality of IPTV service providers, and receive the selected IPTV service from a server of the IPTV service provider.

2. Description of the Related Art

Internet Protocol Television (IPTV) includes a service providing information, moving picture content and a broadcast to a TV via an IP network, i.e., ultra high speed Internet. Since integrated services with communication and broadcasting have become available, much attention has been paid to IPTV, and activation of IPTV is expected to significantly affect not only communication and broadcasting industries but also content creation and household appliance industries.

In order to allow a client to receive an IPTV service via an IP network, an additional IPTV set top box is needed. That is, only clients having an IPTV set top box manufactured according to specifications determined by a service provider who provides an IPTV service can receive the IPTV service. For example, if IPTV service providers of three companies, i.e., an A company, a B company and a C company, are present, a service consumer purchasing a set top box of the A company can use only an IPTV service provided from the A company, and must further purchase a set top box from the B or C company in order to use an IPTV service of the B or C company, respectively. An IPTV network unique to a service provider is referred to as a managed network. Under a managed network, incompatibility between an IPTV service provider and a set top box reduces the range of selection of a service consumer, thereby degrading the quality of an IPTV service or preventing the fundamentals of IPTV service from being increased.

In order to solve incompatibility between an IPTV service provider and a set top box, the Open IPTV Forum that have been recently formed is conducting a discussion about standards for IPTV services. The Open IPTV Forum is discussing the creation of common standards independent of an IPTV service provider and the provision of an IPTV service based on the standards to a service consumer.

Open IPTV is aiming at making an interface and hardware platform that are independent of an IPTV service provider so that IPTV services can be received from a plurality of IPTV service providers via one set top box. According to Open IPTV, since all services provided from a plurality of IPTV service providers can be used via one set top box, the range of service selection of a service consumer can be increased.

The standards for IPTV services is now being established so that not only IPTV services that are provided via a conventional managed network and are dependent of an IPTV service provider but also IPTV services that are provided via an open Internet network and are independent of an IPTV service provider can be provided via one set top box.

SUMMARY OF THE INVENTION

The present invention provides a method of providing/receiving a service by including a search server containing information regarding services of a plurality of service providers so that a client can receive a desired service by detecting the search server.

The present invention also provides a computer readable medium having recorded thereon a computer program for executing the method.

According to an aspect of the present invention, there is provided a method of allowing a client to receive services from a plurality of service providers, the method comprising receiving information regarding at least one service, which is to be received from a server of a service provider selected from among the plurality of service providers, from a search server; requesting the server to provide a service from among the at least one service; and receiving the service provided from the server in response to the request.

The service may be an IPTV (Internet protocol television) service, and the plurality of service providers are a plurality of IPTV service providers.

The receiving of the service may include receiving information regarding the plurality of IPTV service providers from a first search server; selecting the service provider based on information regarding the plurality of IPTV service providers; and receiving information regarding at least one IPTV service, which is to be received from the server of the selected provider, from a second search server.

According to another aspect of the present invention, there is provided a method of allowing a search server to provide information regarding at least one service of a plurality of service providers to a client, the method comprising receiving the information regarding the at least one service from a plurality of servers of the plurality of service providers, and registering the received information; and providing the registered information to the client.

The search server may include a first search server providing information regarding the plurality of IPTV service providers to the client; and a second search server providing information regarding at least one IPTV service, which is to be received from a server of a service provider selected from among the plurality of service providers based on the information regarding the plurality of IPTV service providers, to the client.

According to another aspect of the present invention, there is provided a method of allowing a server of a service provider to provide a predetermined service to a client, the method comprising registering information regarding at least one service that is to be provided from the service provider, with a search server; receiving a request for a service from a client, where the request is made by the client based on the registered information; and providing the service to the client in response to the request, wherein the search server provides the client with at least one service of a plurality of service providers including the service provider.

The registering of the information regarding the at least one service may include registering information regarding the service provider with a first search server; and registering information regarding at least one IPTV service that is to be provided from the server, with a second search server.

According to another aspect of the present invention, there is provided a client for receiving services from a plurality of service providers, the client comprising a service search unit receiving information regarding at least one service, which is to be received from a server of a service provider selected from among the service providers, from a search server; and a service receiving unit requesting a service selected from among the at least one service based on the received information, and receiving the selected service provided from the server in response to the request.

According to another aspect of the present invention, there is provided a search server for providing a client with information regarding at least one service of a plurality of service providers, the search server comprising an information storage unit receiving information regarding at least one service from a plurality of servers of the service providers, and registering the received information; and an information providing unit providing the registered information to the client.

According to another aspect of the present invention, there is provided a computer readable recording medium having recorded thereon a computer program for executing the above methods.

BRIEF DESCRIPTION OF THE DRAWINGS

The above and other features and aspects of the present invention will become more apparent by describing in detail exemplary embodiments thereof with reference to the attached drawings in which.

DETAILED DESCRIPTION OF THE INVENTION

Hereinafter, exemplary embodiments of the present invention will be described in detail with reference to the accompanying drawings.

Figure 1:
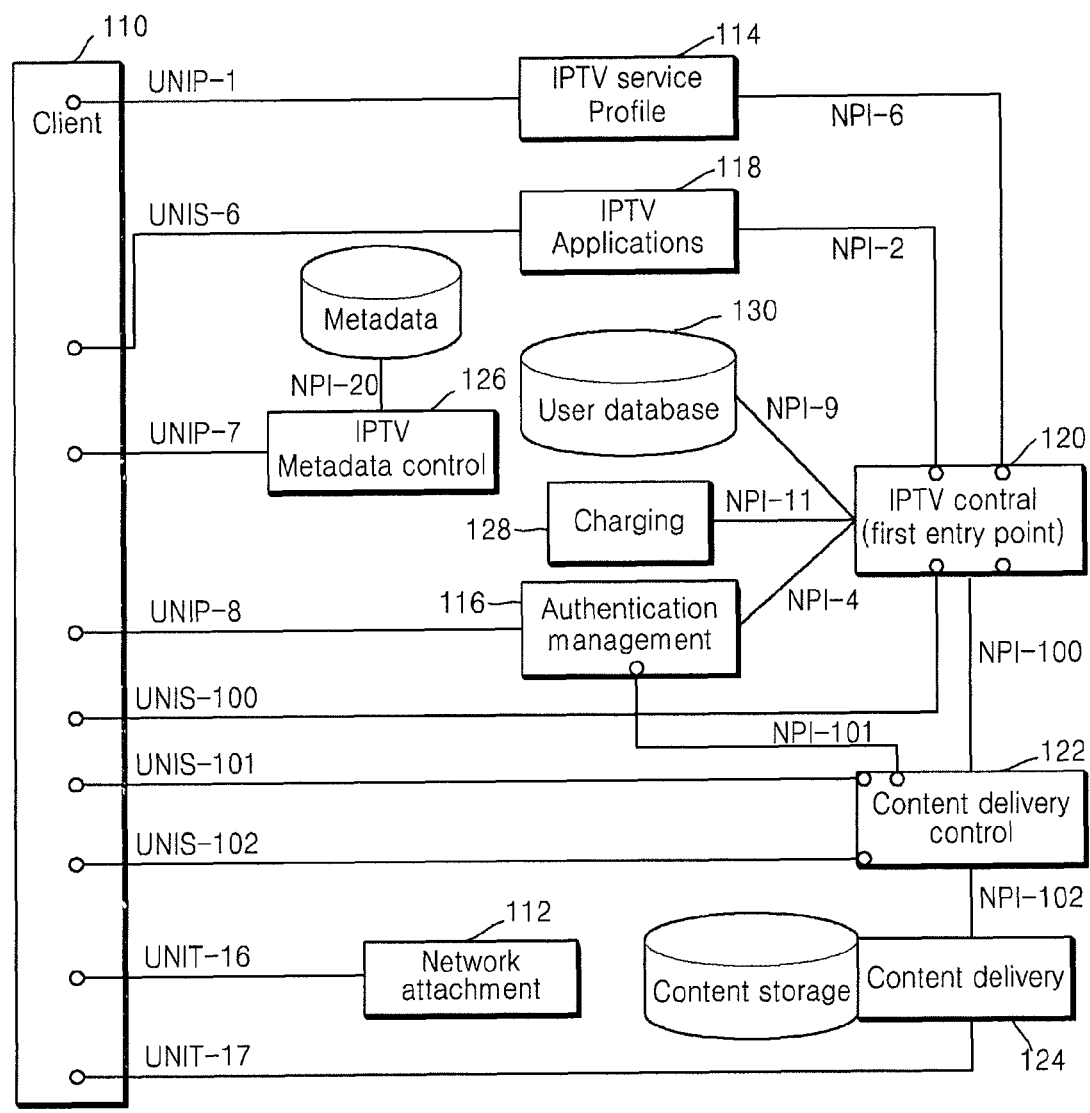
FIG. 1 illustrates an Internet Protocol Television (IPTV) network according to an embodiment of the present invention.

FIG. 1 illustrates an Internet Protocol Television (IPTV) network according to an embodiment of the present invention. Referring to FIG. 1, the IPTV network includes a client 110 and a plurality of IPTV entities. The IPTV entities include a network attachment entity 112, an IPTV service profile entity 114, an authentication management entity 116, an IPTV applications entity 118, an IPTV control entity 120, a content delivery control entity 122, a content delivery entity 124, an IPTV metadata control entity 126, a charging entity 128, and a user database entity 130.

The network attachment entity 112 allocates an IP address to the client 110, and performs network-level user authentication and network construction. In an open IPTV network, an Internet service provider provides the network attachment entity 112.

The IPTV service profile entity 114 retains user profile information of the client 110 related to an IPTV service. When the client 110 requests a service, the user profile information is referred to. For example, the user profile information is referred to in order to provide the client 110 with a personalized IPTV service.

The authentication management entity 116 is charged with authentication of the client 110.

The IPTV applications entity 118 is a server managed by each IPTV service provider. Here, an IPTV service includes not only a TV service, such as linear TV, but also an IPTV application, such as CoD (content on demand), Push CoD, content downloading, network PVR (Personal Video Recording), and messaging. The IPTV applications entity 118 can provide a graphical user interface (GUI) and service data to the client 110, using web-based techniques.

The IPTV control entity 120 provides the client 110 with information regarding the IPTV applications entity 118. For example, the IPTV control entity 120 provides a list of universal resource locators (URLs) of the IPTV applications entity 118. In this case, the list of URLs may be provided via a GUI. The IPTV control entity 120 controls delivery of an IPTV service for an authenticated user, and interacts with the authentication management entity 116 to this end. The IPTV control entity 120 can access the IPTV service profile entity 114 in order to provide an individualized IPTV service. If an advertisement needs to be included in an IPTV service, the IPTV control entity 120 accesses an IPTV applications entity providing the advertisement and controls inclusion of the advertisement.

The content delivery control entity 122 protects content and controls streaming reproduction. The content delivery control entity 122 checks whether a request from the client 110 is available, and checks whether a content access key transmitted from the client 110 is valid, before content delivery begins. Also, the content delivery control entity 122 manages a digital rights management (DRM) key and content encryption. The content delivery control entity 122 may update the DRM key by receiving related data from the authentication management entity 116. The content delivery control entity 122 may also control content reproduction during the content reproduction, i.e., streaming reproduction.

The content delivery entity 124 is charged with content processing, delivery and distribution, under control of the content delivery control entity 122.

The IPTV metadata control entity 126 collects meta data about IPTV services provided via the IPTV network from a content provider, and provides it to the client 110.

The charging entity 128 provides an IPTV service charging mechanism. IPTV service providers can individually make their own charging system.

The user database entity 130 retains information regarding the client 110. Each IPTV service provider can build a user database and store information, such as authentication information, which is not related to an IPTV service, in the user database.

Referring to FIG. 1, the client 110 and the entities 112 through 130 exchange a control signal with one another via a predetermined interface. The name of each of the interfaces illustrated in FIG. 1 is optionally selected and thus may be replaced with another name which appropriately represents the function of the interface.

UNIP-1 denotes an interface for managing a user service profile. That is, the UNIP-1 is an interface defining control and access between the client 110 and the IPTV service profile entity 114.

UNIP-7 denotes an interface allowing metadata of a service or a program guide to be used in a predetermined metadata format during searching for the service. Data for guiding at least one IPTV service is stored in a metadata storage unit. An IPTV service provider or a service platform provider can modify metadata stored in the metadata storage unit.

UNIP-8 denotes an interface for performing authentication when the client 110 tries to access an IPTV service.

UNIS-6 denotes an interface defined for the client 110 to request the IPTV applications entity 118 to provide a predetermined IPTV service. That is, the UNIS-6 is an interface allowing the client 110 to request the IPTV applications entity 118 (server that provides an IPTV service) to provide a predetermined IPTV service, and to receive the predetermined service in response to the request. The client 110 can access the IPTV applications entity 118 as guided by a GUI containing the URL or link information of the IPTV applications entity 118, which is received from the IPTV control entity 120. UNIS-6 may define an authentication process of checking an identifier or password of the client 110 if necessary.

UNIS-100 denotes an interface for the client 110 to receive information regarding IPTV services that can be received via the IPTV network, from the IPTV control entity 120. In this case, the client 110 may receive a GUI containing links to the IPTV services or create a page containing the links to the IPTV services by receiving only guide data regarding the IPTV services.

UNIS-101 denotes an interface defining control of content reproduction. UNIS-101 allows control of content reproduction, such as pausing, stopping, or fast-forwarding, during receiving and reproducing content, e.g., streaming data, from the content delivery entity 124.

UNIS-102 denotes an interface for managing and controlling a DRM key while the client 110 receives content.

UNIT-16 denotes an interface necessary for the client 110 to attach the IPTV network.

UNIT-17 denotes an interface defined in order to transmit content data to the client 110 through unicasting, multicasting or downloading. In this case, real-time transmission or non real-time transmission may be defined.

NPI-6 denotes an interface defined for the IPTV control entity 120 to access and manage the user profile information stored in the IPTV service profile entity 114. The IPTV control entity 120 accesses the user profile information in order to provide the client 110 with an individualized IPTV service.

NPI-2 denotes an interface defined for the IPTV applications entity 118 to register data regarding an IPTV service with the IPTV control entity 120 or cancel the data from the IPTV control entity 120. NPI-2 can also be used when the IPTV applications entity 118 registers information regarding an IPTV service provider with the IPTV control entity 120 or cancels it from the IPTV control entity 120.

NPI-9 denotes an interface defined for the IPTV control entity 120 to access and manage user information stored in the user database entity 130.

NPI-11 denotes an interface for retaining charging data generated when a user uses content.

NPI-4 denotes an interface for preventing information regarding IPTV services from being illegally used and checking whether the client 110 is an authenticated user, before the information is provided to the client 110.

NPI-20 denotes an interface for the IPTV metadata control entity 126 to control the metadata storage unit.

NPI-100 denotes an interface for the IPTV control entity 120 to begin or manage content delivery.

NPI-101 denotes an interface for managing authentication information related to content delivery.

NPI-102 denotes an interface for the content delivery control entity 122 to control the content delivery entity 124 to control content delivery. NPI-102 may also define encryption of content.

Figure 2:
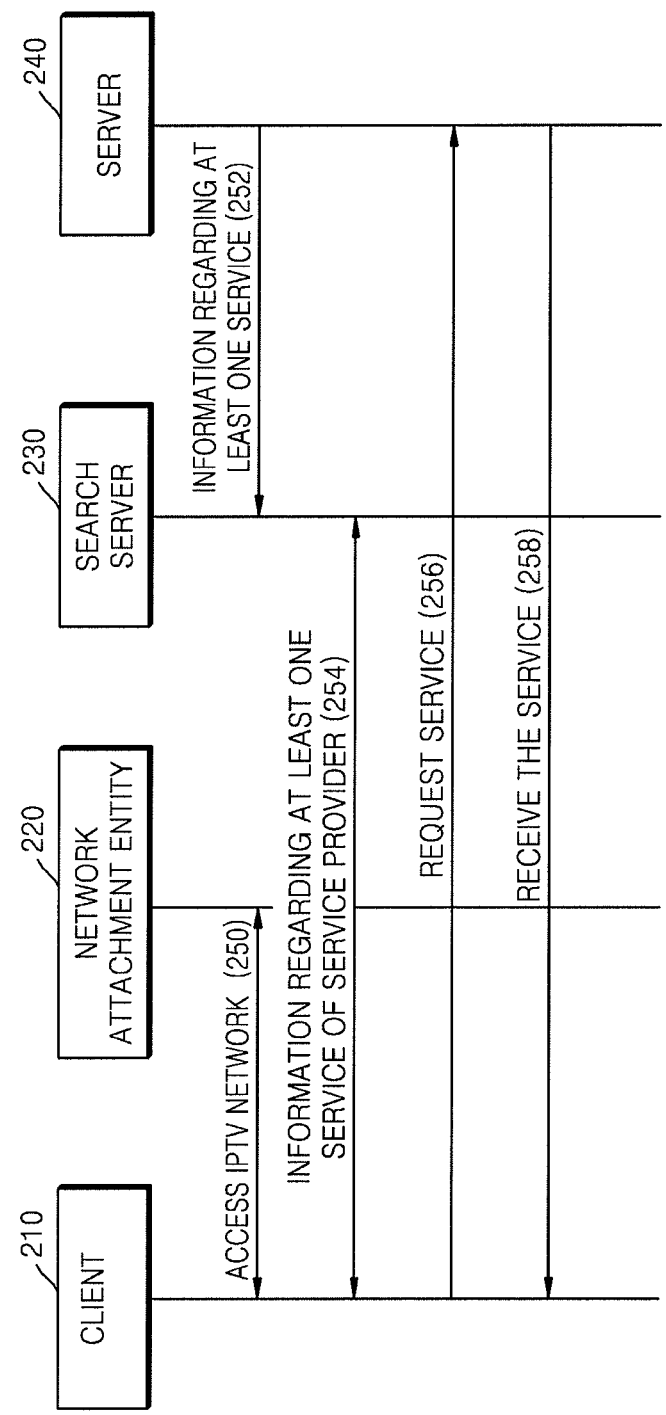
FIG. 2 is a flowchart illustrating providing/receiving a service according to an embodiment of the present invention.

FIG. 2 is a flowchart illustrating a method of providing/receiving a service according to an embodiment of the present invention. In detail, FIG. 2 illustrates a method of allowing a client 210 to receive a predetermined service from a server 240 of a service provider. It is assumed that the client 210 is an IPTV service client, such as an IPTV set top box, and the server 240 is an IPTV service server that provides an IPTV service. However, it would be obvious to those of ordinary skill in the art that the present invention can be applied to not only a method and apparatus for providing/receiving an IPTV service but also a method and apparatus for providing/receiving services of a plurality of service providers.

Hereinafter, it is understood that a method and apparatus for providing/receiving a service according to the present invention can be used to provide or receive at least one of an IPTV service received via a managed network and an IPTV service received via an open Internet network.

Referring to FIG. 2, in operation 250, the client 210 accesses a network attachment entity 220 in order to attach an IPTV network according to the present invention. The network attachment entity 220 provides an IP address to the client 210 so that the client 210 can access the IPTV network, and performs network-level authentication and network construction. In the open Internet network, an Internet service provider (ISP) that provides an Internet service provides the network attachment entity 220.

Information regarding a search server 230 may be provided to the client 210 while network attachment is made in operation 250. In operations 254 and 256, in order to access the search server 230 and the server 240, the client 210 must know the address of the search server 230 that is to be first accessed. When network attachment is made in operation 250, the URL of the search server 230 may be provided to the client 210. If the client 210 has already known the URL of the search server 230, the URL of the search server 230 does not need to be additionally provided to the client 210.

In operation 252, the server 240 registers information regarding at least one of services that the server 240 can provide, with the search server 230. The server 240 is a server of a service provider from among a plurality of service providers, and provides at least one IPTV service of the service provider. Here, the IPTV service includes a TV service, such as linear TV, and an IPTV application, such as CoD (content on demand), Push CoD, content downloading, network PVR, and messaging.

The search server 230 is an entity that provides the client 210 with information regarding IPTV services that can be provided via the IPTV network. The search server 230 stores not only information regarding IPTV services that the service provider can provide but also information regarding IPTV services that a plurality of service providers can provide in the IPTV network attached by the client 210. Thus, the client 210 can obtain information regarding all IPTV services that can be provided to the client 210 by accessing the search server 230.

In operation 254, the client 210 receives information regarding at least one of services of a plurality of service providers from the search server 230. The client 210 may receive information regarding at least one of IPTV services that the client 210 can receive from a service provider selected from among a plurality of service providers, from the search server 230. As described above, an IPTV service may include linear TV, CoD, push CoD, content downloading, network PVR, and messaging. The client 210 receives information regarding at least one IPTV service of a service provider selected from among a plurality of service providers by the client 210.

The client 210 can perform authentication by accessing a predetermined entity (authentic management entity) that performs authentication management using an interface for authentication, and receive information regarding an IPTV service from the search server 230 after the authentication is completed. When the client 210 tries to access the search server 230 for the first time, the search server 230 first requests the client 210 to receive authentication from the authentication management entity. The client 210 receiving the request, requests the authentication management entity to authenticate the client 210. The authentication management entity may perform authentication by transmitting the result of the authentication to the client 210 and the search server 230. Alternatively, authentication may be performed by transmitting an encryption key for accessing the search server 230 to the client 210.

The information regarding the IPTV service may include information regarding an entry point for requesting and receiving the IPTV service. The information regarding the entry point means information regarding a first page for receiving IPTV services of the server 240. The first page may include a GUI containing links to the IP services. If the client 210 is compatible with web-based technology, the search server 230 may provide the client 210 with a web page containing the links to the IPTV services. Also, the search server 230 may create an extensible Markup Language (XML) document including information regarding an IPTV service and provide it to the client 210 so that the client 210 can individually create an entry point.

The information regarding the IPTV service may include metadata about the IPTV service and not the address of the server 240. Information regarding all IPTV services including the URLs of the IPTV services, which is stored in the first server 240, may be provided to the client 210 in the form of metadata. In this case, the search server 230 functions as an entity controlling IPTV metadata. The search server 230 provides the metadata to the client 210 by periodically multicasting or unicasting the metadata, in response to a request from the client 210. Operation 254 is performed using a predetermined interface defined between the search server 230 and the client 210 in order to exchange information regarding an IPTV service.

In operation 256, the client 210 requests to provide a predetermined service based on the information regarding the IPTV service received in operation 254. The client 210 selects the predetermined service based on the information regarding the IPTV service, which was received in operation 254, and requests the server 240 to provide the selected service.

In operation 258, the client 210 receives the predetermined service from the server 240. That is, the client 210 receives the IPTV service requested in operation 256.

Figure 3:
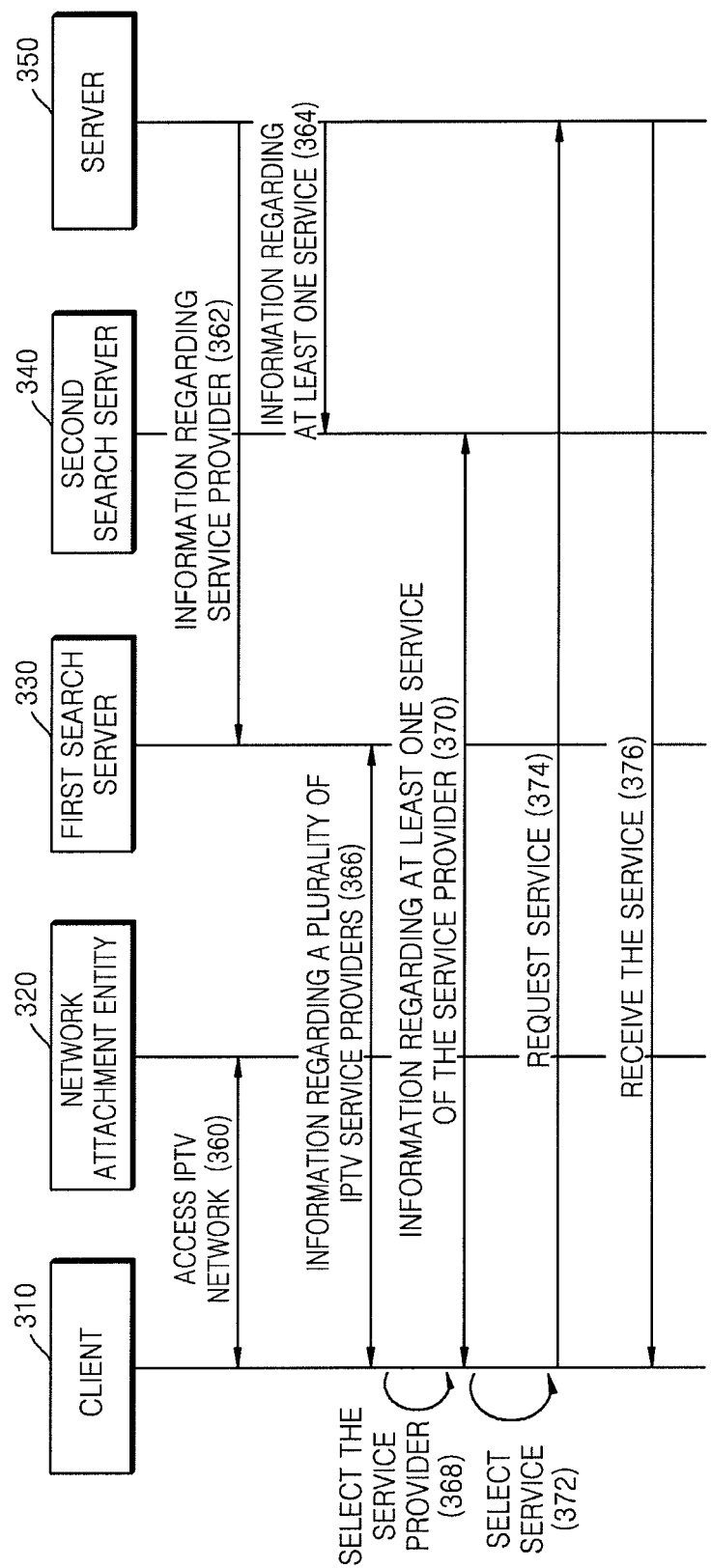
FIG. 3 illustrates providing/receiving a service according to another embodiment of the present invention.

FIG. 3 illustrates a method and apparatus for providing/receiving a service according to another embodiment of the present invention. That is, FIG. 3 illustrates operations 252 and 254 illustrated in FIG. 2 in greater detail.

Referring to FIG. 3, in operation 360, a client 310 accesses a network attachment entity 320 in order to access an IPTV network according to the present invention. Information regarding the addresses of a first search server 330 and a second search server 340 may be provided to the client 310 while performing network attachment, as described above with respect to operation 250 illustrated in FIG. 2.

In the method of FIG. 3, the two separate search servers 330 and 340 are present. Thus, either only the address of the first search server 330 that is to be first accessed or both the addresses of the first and second search servers 330 and 340 may be provided to the client 310. If the client 310 already knows the addresses of the first and second search servers 330 and 340, their addresses do not need to be additionally provided.

In operation 362, a server 350 registers information regarding a service provider with the first search server 330. Here, the server 350 belongs to the service provider. The first search server 330 is an entity providing information regarding a plurality of IPTV service providers that provide an IPTV service in an IPTV network according to the present invention. The information regarding the IPTV services is provided to the client 310. To this end, in operation 362, the information regarding the service provider from among the service providers is registered with the first search server 330.

In operation 364, the server 350 registers information regarding at least one of IPTV services that the server 350 of the service provider can provide to the client 310, with the second search server 340. The second search server 340 is an entity providing information regarding at least one of IPTV services of a plurality of IPTV service providers.

As described above, an IPTV service may include at least one of linear TV, CoD, push CoD, content downloading, network PVR, and messaging.

In operation 366, the first search server 330 provides the client 310 with the information regarding the IPTV service providers. The information regarding the IPTV service providers who provide an IPTV service via the IPTV network according to the present invention is registered with the first search server 330, and the first search server 330 provides the information to the client 310. A predetermined interface defined in order to transmit information regarding a service provider is used in order to deliver the information regarding the IPTV service providers to the client 310. The information regarding the IPTV service providers, which is provided to the client 310, is necessary for the client 310 to select a desired service provider from among the IPTV service providers. Information, such as names or logos of the IPTV service providers, may be provided to the client 310.

The information regarding the IPTV service providers is provided to the client 310 only when the client 310 receives authentication from an authentication management entity by using a predetermined interface defined for authentication.

In operation 368, the client 310 selects a predetermined service provider based on the information regarding the IPTV service providers received in operation 366. That is, an IPTV service provider is selected from among the IPTV service providers based on the information regarding the IPTV service providers received in operation 366.

In operation 370, the client 310 receives information regarding at least one IPTV service that can be received from the server 350 of the IPTV service provider selected in operation 368, from the second search server 340. The client 310 requests the second search server 340 to provide information regarding at least one service of the selected service provider via a predetermined interface defined to request information regarding a service, and receives the information regarding the at least one service provided in response to the request.

The information regarding the IPTV service may be information regarding an entry point for requesting and receiving the IPTV service, that is, it may be a first page allowing the IPTV services of the server 350 to be used.

In the method illustrated in FIG. 3, information regarding IPTV service provider and an IPTV service is provided to the client 310 via the two separate search servers 330 and 340. The client 310 first accesses the first search server 330 in order to select a desired IPTV service provider, and receives information regarding at least one service of the selected IPTV service provider from the second search server 340.

In operation 372, the client 310 selects a predetermined IPTV service based on the information regarding the services of the selected service provider.

In operation 374, the client 310 requests the server 350 to provide the service selected in operation 372. In operation 376, the client 310 receives the selected service. Operations 374 and 376 are performed using a predetermined interface defined in order to request and receive a service.

Figure 4:
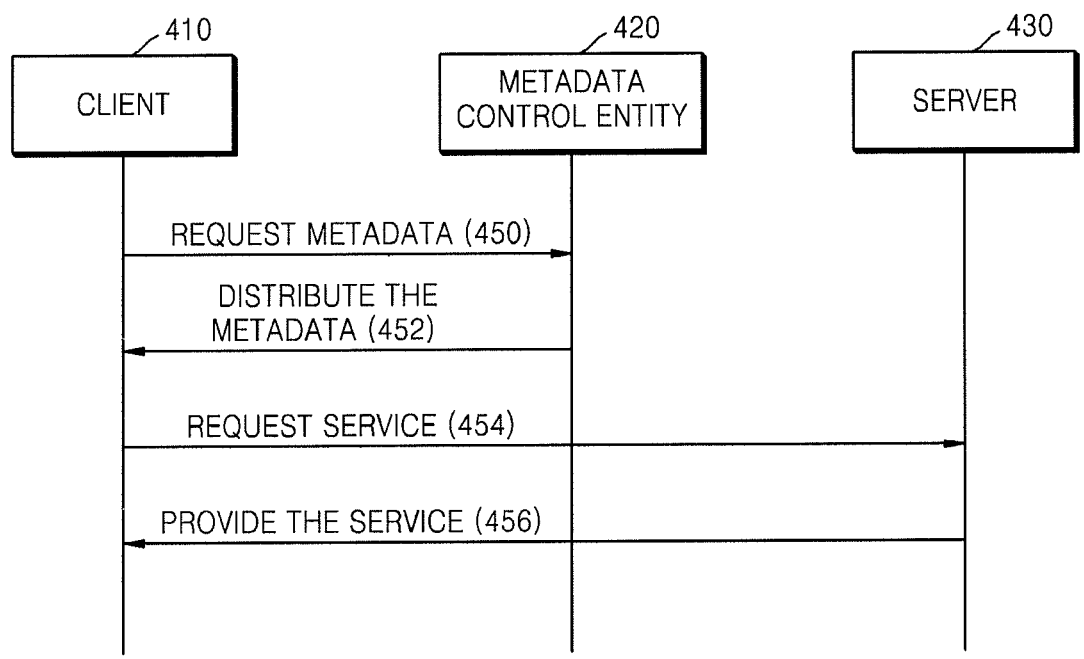
FIG. 4 illustrates providing/receiving a service according to another embodiment of the present invention.

FIG. 4 illustrates a method and apparatus for providing/receiving a service according to another embodiment of the present invention. In detail, FIG. 4 illustrates a case where information regarding an IPTV service as described above with reference to FIGS. 2 and 3 is metadata.

Referring to FIG. 4, a metadata control entity 420 collects metadata regarding an IPTV service/content guide received via an IPTV network from a content provider or a content information provider, and provides the collected metadata to clients. The service guide is an electronic guide including additional information regarding IPTV functions, information regarding service providers, and information regarding appropriate service access, which are necessary for a user to select a desired IPTV function. The content guide is an electronic guide that a user uses to select, discover, or navigate content according to time, title, channel, genre, etc. . . . In operation 450, a client 410 requests the metadata control entity 420 to provide metadata regarding at least one service of a plurality of service providers in an IPTV network or metadata regarding the content guide.

In operation 452, the metadata control entity 420 distributes the metadata regarding the at least one service of the content guide to the client 410, in response to the request made in operation 450. The metadata may be distributed to the client 410 through unicasting or multicasting only when the client 410 clearly requests it as in operation 450, but the metadata may be periodically distributed to the client 410 through multicasting regardless of a request from the client 410. Operations 450 and 452 are performed using an interface defined between the client 410 and the metadata control entity 420 in order to request and distribute metadata.

In operation 454, the client 410 requests a server 430 to provide a service and receives the service from the server 430 in operation 456.

Figure 5:
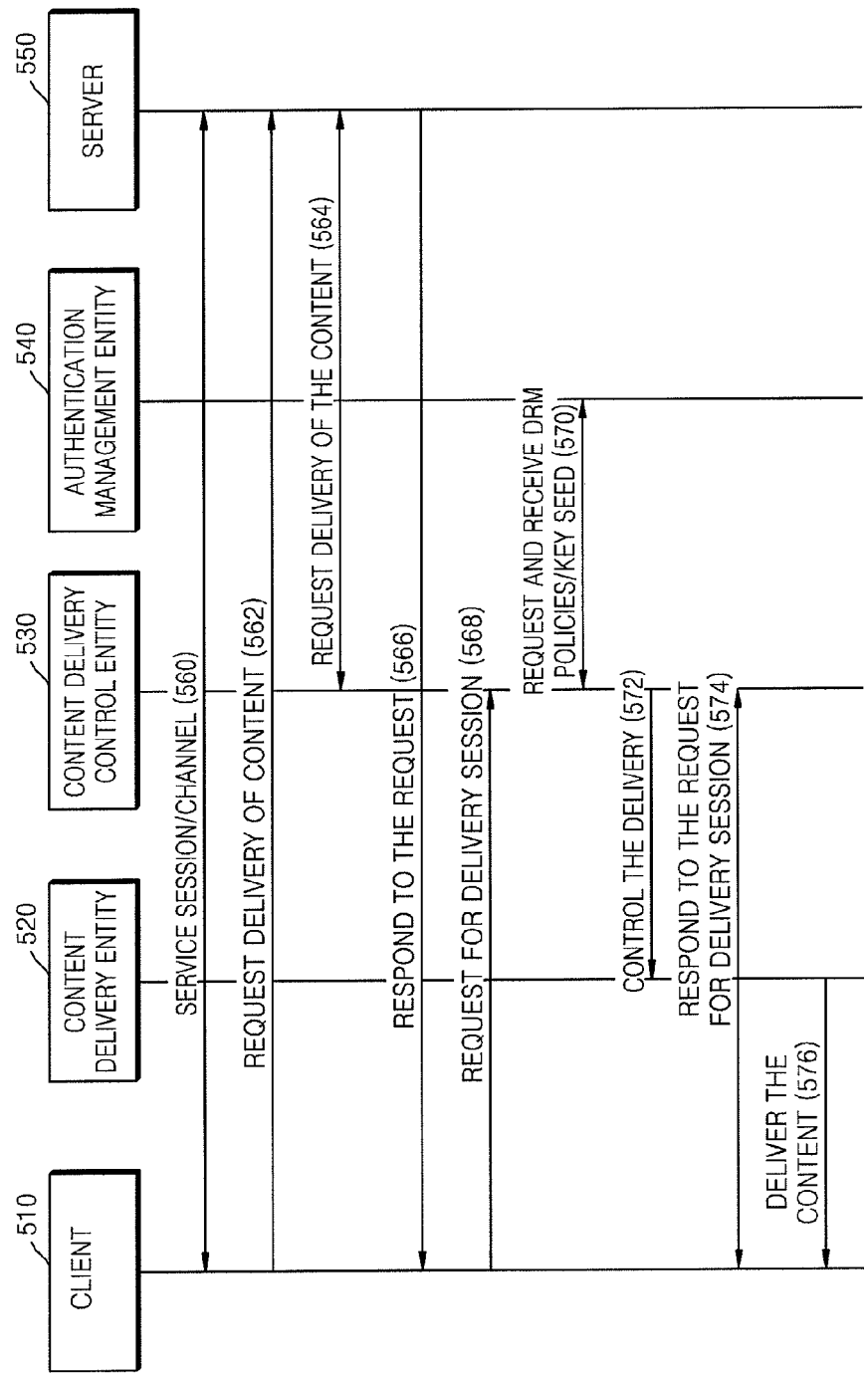
FIG. 5 illustrates providing/receiving a service according to another embodiment of the present invention.

FIG. 5 illustrates a method and apparatus for providing/receiving a service according to another embodiment of the present invention. FIG. 5 illustrates DRM of content provided from a server 550. That is, FIG. 5 illustrates a DRM method used when the client 510 requests and receives content stored in a server 550 through CoD, Push CoD, content downloading, and network PVR.

In operation 560, the client 510 establishes a service session and channel with the server 550 of an IPTV service provider. The client 510 accesses a search server according to the present invention by receiving authentication from an authentication management entity 540, and receives information regarding at least one IPTV service that can be received from the server 550, from the search server. Then, the client 510 selects an IPTV service from among the at least one IPTV service based on the received information, and establishes a service session and channel with a server 550. Then, the service session and channel are formed, and delivery of content related to a predetermined service is performed in operations 562 through 576.

In operation 562, the client 510 requests the server 550 to provide predetermined content. That is, the client 510 requests the server 550 to deliver the predetermined content from among content of the server 560, based on the information regarding the IPTV service received in operation 560.

In operation 564, the server 550 requests a content delivery control entity 530 to deliver the requested content to the client 510. Information regarding the requested content and information regarding the client 510 are transmitted to the content delivery control entity 530.

The content delivery control entity 530 determines whether the request for delivery of the predetermined content from the client 510 is available. Also, the content delivery control entity 530 determines whether a DRM key received from the client 510 is valid, prior to starting a content delivery session. The content delivery control entity 530 manages the DRM key and content encryption, and can update the DRM key by receiving related information from the authentication management entity 540. Also, as will later be described, the content delivery control entity 530 can control reproduction of reproduction during streaming of the content.

The content delivery control entity 530 provide the server 550 with information regarding whether the content can be delivered and information regarding DRM applied to the content, in response to the request from the server 550.

In operation 566, the server 550 provides the client 510 with the information regarding the DRM applied to the content and information regarding the content delivery control entity 530, in response to the request for delivery of the content in operation 562. The information regarding the DRM may include information regarding the DRM key, and the information regarding the content delivery control entity 530 may include information regarding the address of the content delivery control entity 530.

In operation 568, the client 510 requests the content delivery control entity 530 to start the content delivery session based on the information regarding the address of the content delivery control entity 530 that is received in operation 566. In this case, the DRM key, information about which is received in operation 570, is also transmitted to the content delivery control entity 530.

In operation 570, the content delivery control entity 530 requests the authentication management entity 540 to deliver at least one of DRM policies and a DRM key seed, and receives at least one of the DRM policies and the DRM key seed provided in response to the request. Operation 570 is performed using an interface for DRM, defined between the content delivery control entity 530 and the authentication management entity 540. The authentication management entity 540 authenticates the client 510 and a user of the client 510, and manages the DRM policies and DRM key of content provided as an IPTV service.

The content delivery control entity 530 determines whether the request for starting the content delivery session from the client 510 is available, based on the DRM policies and the DRM key seed received from the authentication management entity 540 and the DRM key that was received from the client 510 in operation 568.

In operation 572, the content delivery control entity 530 controls the content delivery entity 520 to begin the content delivery session. If it is determined that the request to start the content delivery session from the client 510 is available, the information regarding the requested content and the address of the client 510 is transmitted to the content delivery entity 520 so that the content delivery session can begin. The content delivery entity 520 is charged with content processing, e.g., content encryption, and content delivery and distribution. Operation 572 is performed using an interface defined between the content delivery control entity 530 and the content delivery entity 520 in order to control delivery of content of the content delivery entity 520. Also, the interface defined between the content delivery control entity 530 and the content delivery entity 520 may define control of content encryption performed by the content delivery entity 520.

In operation 574, the content delivery control entity 530 transmits information regarding the content delivery entity 520 to the client 510, in response to the request to start the content delivery session in operation 568. In operation 576, the content delivery entity 520 delivers the content to the client 510. Operations 568 and 574 are performed using an interface defined between the client 510 and the content delivery control entity 530 in order to request starting of the content delivery session and to respond to the request.

There is a case where the client 510 requests control of reproduction of content during the reproduction of the content. For example, the client 510 may request pausing, or jumping forward or backward during reproduction of network PVR content. In this case, the client 510 may transmit a request for the content delivery control entity 530 to control the reproduction of the content, and the content delivery control entity 530 transmit the request to the content delivery entity 520, thereby performing control of the content reproduction.

Such control of content reproduction is referred to as a 'trick mode'. The trick mode is performed using an interface between the client 510 and the content delivery control entity 530 and an interface between the content delivery entity 520 and the content delivery control entity 530, which are defined in order to control content reproduction.

Figure 6:
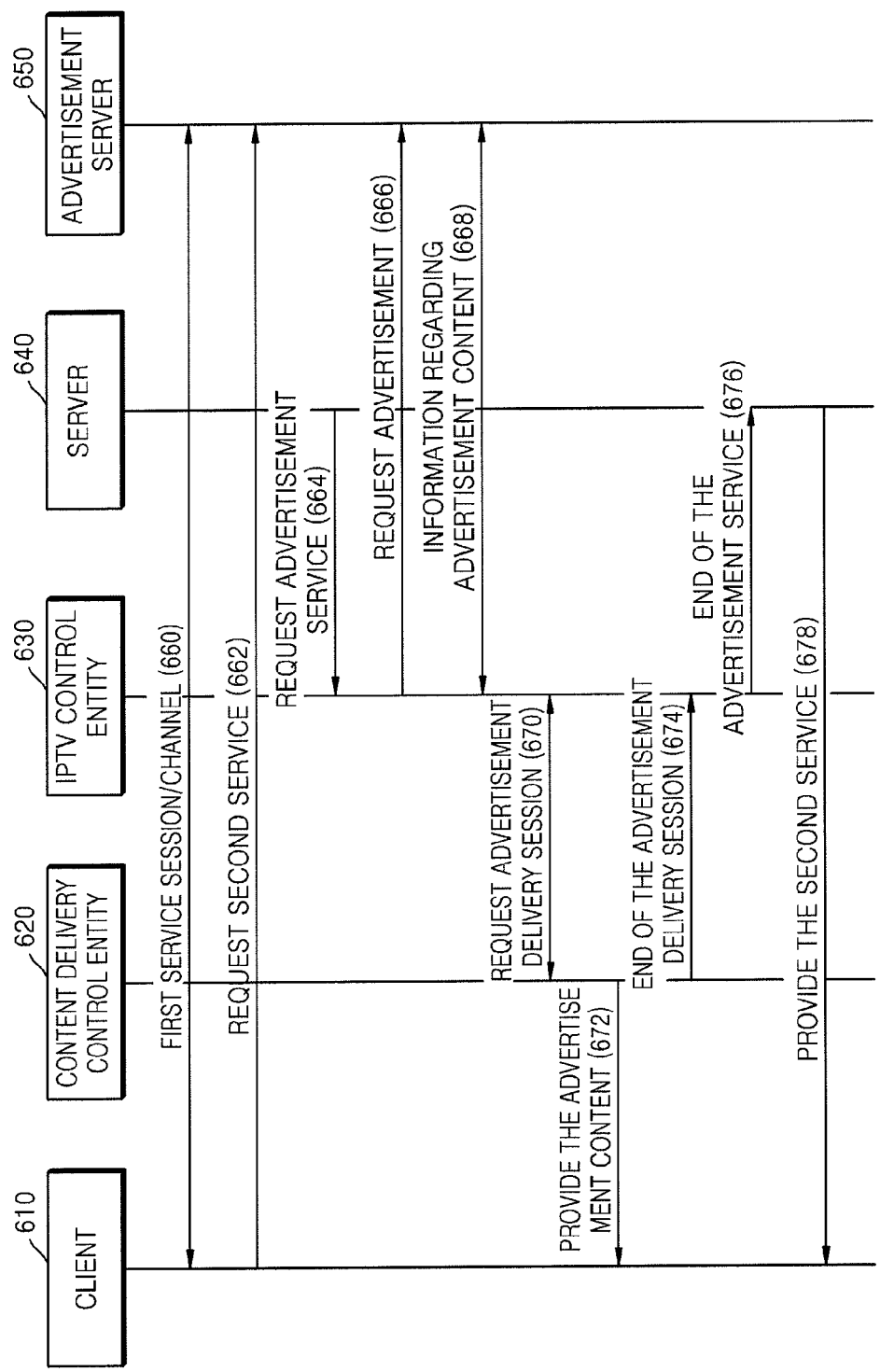
FIG. 6 illustrates providing/receiving a service according to another embodiment of the present invention.

FIG. 6 illustrates a method and apparatus for providing/receiving a service according to another embodiment of the present invention. In detail, FIG. 6 illustrates a method of allowing the client 610 to receive a second service by switching from a first service to the second service during receiving of the first service. In other words, FIG. 6 illustrates a method of allowing the client 610 to insert an advertisement since the client 610 must receive and reproduce the advertisement in order to switch from the first service to the second service while receiving the first service.

In operation 660, the client 610 receives the first service from a server 640 of an IPTV service provider by establishing a session and channel of the first service. To this end, the client 610 accesses a search server according to the present invention by receiving authentication from an authentication management entity, and receives information regarding at least one IPTV service, which can be received from the server 640, from the search server. Then, the client 610 establishes with the session and channel of the first service with the server 640 by selecting an IPTV service from among the at least one IPTV service based on the information regarding the IPTV service.

In operation 662, the client 610 requests the server 640 to provide the second service. Since the client 610 has already retained the information regarding the at least one IPTV service, the client 610 selects the second service from among the at least one IPTV service.

In operation 664, the server 640 requests an IPTV control entity 630 to provide an advertisement service. When an advertisement needs to be provided between the first and second services in order to provide the second service, the server 640 requests the IPTV control entity 630 to provide the advertisement.

In operation 666, the IPTV control entity 630 requests an advertisement server 650 to provide a predetermined advertisement. In this case, an individualized advertisement may be required using user profile information of the client 610. An advertisement that the client 610 desires to receive may be requested by analyzing the propensity of the client 610.

In operation 668, the advertisement server 650 transmits information regarding the predetermined advertisement to the IPTV control entity 630 in response to the request received in operation 666. For example, the advertisement that is to be delivered to the client 610, and the address of a content delivery control entity 620 that is to transmit the advertisement are delivered to the IPTV control entity 630.

In operation 670, the IPTV control entity 630 requests the content delivery control entity 620 to start an advertisement delivery session.

In operation 672, the content delivery control entity 620 controls a content delivery entity to deliver the requested advertisement to the client 610, in response to the request from the IPTV control entity 630.

In operation 674, the content delivery control entity 620 informs the IPTV control entity 630 of the end of the advertisement delivery session when the delivery of the advertisement is completed.

In operation 676, the IPTV control entity 630 informs the server 640 of the end of the advertisement service, and thus, in operation 678, the server 640 provides the second service to the client 610.

Figure 7:
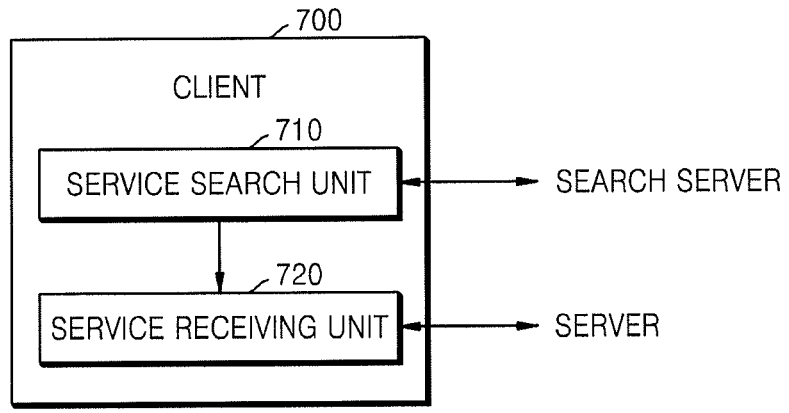
FIG. 7 is a block diagram of a client according to an embodiment of the present invention.

FIG. 7 is a block diagram of a client 700 according to an embodiment of the present invention. Referring to FIG. 7, the client 700 includes a service search unit 710 and a service receiving unit 720.

The service search unit 710 receives information regarding at least one of a plurality of service providers from a search server. The client 700 is an IPTV client, and receives information regarding at least one IPTV service of a plurality of service providers in an IPTV network from the search server. The client 700 may receive information regarding at least one service of a service provider selected from among a plurality of service providers by the client 700.

There is a case where the search server includes separate entities: a first search server that provides information regarding a plurality of service providers and a second search server that provides information regarding services of each of the service providers. In this case, the information regarding the service providers is first received from the first search server, and a service provider is selected from among the service providers based on the received information. Then, information regarding at least one service that can be received from the server of the selected service provider is received from the second search server. The information regarding the at least one service provider may include at least one of a name and logo of each of the IPTV service providers. The information regarding the at least one service may include information regarding a service entry point, i.e., information regarding a first page allowing use of IPTV services that can be received from the server.

The service receiving unit 720 requests the server to provide a service selected from among at least one service that can be received from the server, and receives the selected service provided in response to the request.

Figure 8:
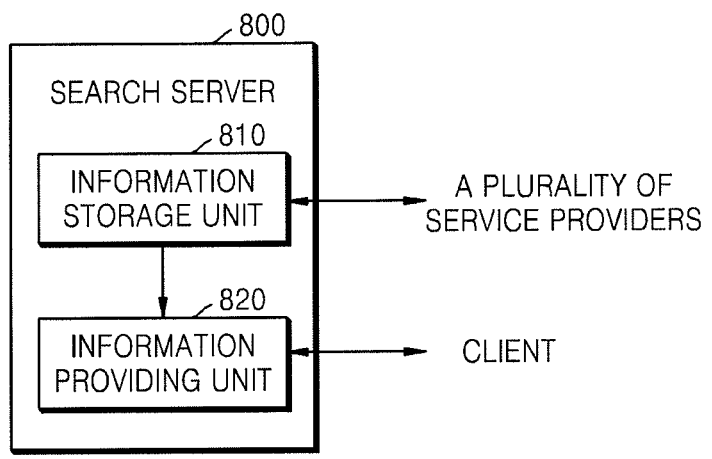
FIG. 8 is a block diagram of a search server according to an embodiment of the present invention.

FIG. 8 is a block diagram of a search server 800 according to an embodiment of the present invention. Referring to FIG.

8, the search server 800 includes an information storage unit 810 and an information providing unit 820.

The information storage unit 810 receives information regarding a service provider and/or information regarding a service from a plurality of service providers in an IPTV network.

The search server 800 may include separate entities: a first search server that registers information regarding a plurality of service providers and a second search server that receives information regarding at least one service of each of the service providers from a corresponding server from among a plurality of servers and then registers the received information.

Thus, if the search server 800 is one entity, it registers information regarding a plurality of service providers and information regarding services received from a plurality of servers of the service providers. However, if the search server 800 includes the first search server and the second search server, the information storage unit 810 registers information regarding a plurality of service providers and information regarding services.

When the search server 800 acts as the first search server, the information storage unit 810 registers only information regarding a plurality of service providers, but when the search server 800 acts as the second search server, the information storage unit 810 registers information regarding at least one service.

The information providing unit 820 provides a client with information regarding a plurality of service providers, and information regarding at least one service of a service provider selected from among the service providers by the client. If the search server 800 includes the first search server and the second search server as described above, information regarding a plurality of service providers or information regarding at least one service is provided to the client.

If the search server 800 acts as the first search server, the information providing unit 820 provides information regarding a plurality of service providers to the client. If the search server 800 acts as the second search server, the information providing unit 820 provides information regarding at least one service to the client.

Figure 9:
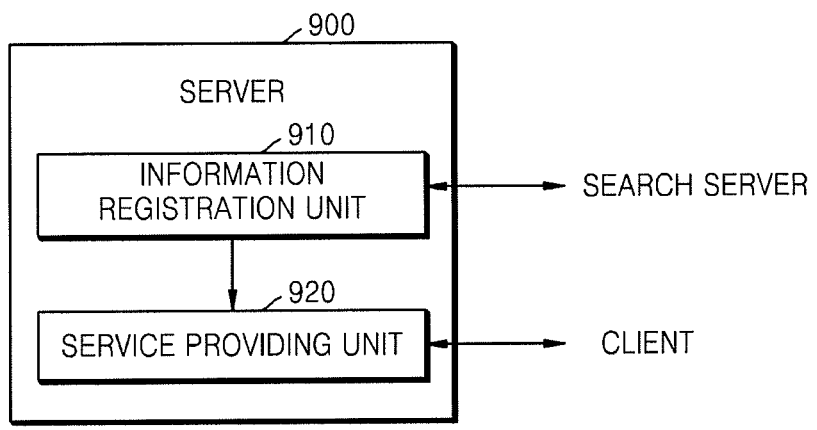
FIG. 9 is a block diagram of a server according to an embodiment of the present invention.

FIG. 9 is a block diagram of a server 900 according to an embodiment of the present invention. Referring to FIG. 9, the server 800 provides an IPTV service in an IPTV network according to the present invention, and includes an information registration unit 910 and a service providing unit 920. It is assumed that the server 900 is a server of a service provider from among a plurality of service providers in the IPTV network.

The information registration unit 910 registers information regarding at least one service that can be provided from the service provider, with a search server. As described above, the search server may include separate entities: a first search server that provides information regarding a plurality of service providers and a second server that provides information regarding services of each of the service providers.

In this case, the information registration unit 910 registers information regarding the service provider with the first search server, and information regarding at least one service of the service provider with the second search server.

The service providing unit 920 receives a request for a predetermined service from a client, and provides the client with the predetermined service in response to the request. For example, a service is provided to a client authenticated by a predetermined authentication management entity. The client requests the service providing unit 920 to provide a service, based on the information regarding the service provider and the information regarding the at least one service of the service provider, which is registered by the information registration unit 910.

The system according to the present invention can be embodied as computer readable code in a computer readable medium. Here, the computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. Also, the computer readable medium may be a carrier wave that transmits data via the Internet, for example. The computer readable medium can be distributed among computer systems that are interconnected through a network, and the present invention may be stored and implemented as computer readable code in the distributed system.

According to the above embodiments of the present invention, a client can precisely search for and receive a desired service in a predetermined network via which a plurality of service providers provide services. In particular, the client can search for and receive not only an IPTV service of a service provider in a managed network but also an IPTV service of a service provider in an open Internet network, thereby improving the quality of IPTV service and increasing the fundamentals of IPTV service.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A method of allowing a client to receive services from a plurality of service providers, the method comprising:

receiving, from a first search server, first information regarding a plurality of service providers registered in the first search server including a first service provider, the first information regarding the first service provider being registered in the first search server by a first server belonging to the first service provider;

receiving, from a second search server, second information regarding a plurality of services registered in the second search server provided by the first service provider, the first service provider being selected from among the plurality of service providers based on the received first information, the second information being registered in the second search server by the first server;

wherein the first search server and second search server are separate physical devices, separate and distinct from the plurality of service providers;

transmitting a request, by the client to the first server, for a service selected from among the plurality of services provided by the first service provider based on the received first and second information; and receiving the service from the first server in response to the transmitting of the request;

wherein the service is an Internet Protocol Television (IPTV) service, and the plurality of service providers include a plurality of IPTV service providers.

2. The method of claim 1 wherein the second information includes an entry point of at least one IPTV service.

3. The method of claim 1 wherein the second information includes metadata about at least one IPTV service.

4. The method of claim 1 wherein the first information comprises at least one of a name and logo of each of the plurality of IPTV service providers.

5. The method of claim 1 wherein the IPTV service comprises at least one of a linear TV service, a personal video recording (PVR) service, and a content on demand (CoD) service.

6. A client for receiving services from a plurality of service providers, the client comprising:
   a device, including a processor and memory having instructions stored thereupon that when executed by the processor, implement:
   a service search unit which receives, from a first search server, first information regarding a plurality of service providers registered in the first search server, including a first service provider, the first information regarding the first service provider being registered in the first search server by a first server belonging to the first service provider, and receives, from a second search server, second information regarding a plurality of services registered in the second search server, including services provided by the first service provider, the first service provider being selected from among the plurality of service providers based on the received first information, the second information being registered in the second search server by the first server;
   wherein the first search server and second search server are separate physical devices, separate and distinct from the plurality of service providers;
   a service receiving unit which transmits a request, to the first server, for a service selected from among the plurality of services based on the received first and second information, and receives, from the first server, the selected service in response to the transmitting of the request;
   wherein the service is an Internet protocol television (IPTV) service, and the plurality of service providers include a plurality of IPTV service providers.

7. A non-transitory computer readable medium having recorded thereon a computer program for executing the method of claim 1.

* * * * *